(12) United States Patent
Naka et al.

(10) Patent No.: US 11,766,861 B2
(45) Date of Patent: Sep. 26, 2023

(54) INK JET PRINTING APPARATUS

(71) Applicant: CANON KABUSHIKI KAISHA, Tokyo (JP)

(72) Inventors: Hironori Naka, Tokyo (JP); Hiroyuki Takahashi, Kanagawa (JP); Yuta Shinsawatsu, Kanagawa (JP); Shinya Ishikawa, Kanagawa (JP); Hideyuki Ueki, Tokyo (JP); Kotaro Kimoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 59 days.

(21) Appl. No.: 17/500,266

(22) Filed: Oct. 13, 2021

(65) Prior Publication Data
US 2022/0111635 A1 Apr. 14, 2022

(30) Foreign Application Priority Data
Oct. 14, 2020 (JP) .................. 2020-173539

(51) Int. Cl.
*B41J 2/045* (2006.01)
*G06K 15/10* (2006.01)

(52) U.S. Cl.
CPC ......... *B41J 2/0451* (2013.01); *B41J 2/04563* (2013.01); *G06K 15/102* (2013.01)

(58) Field of Classification Search
CPC ... B41J 2/0451; B41J 2/04563; G06K 15/102; G06F 3/1229; G06F 3/121
See application file for complete search history.

(56) References Cited

U.S. PATENT DOCUMENTS

| | | | |
|---|---|---|---|
| 2012/0026545 A1* | 2/2012 | Miura | G06F 3/121 358/1.15 |
| 2012/0050812 A1* | 3/2012 | Takahashi | B41J 29/38 358/1.16 |

FOREIGN PATENT DOCUMENTS

JP 2018-077679 A 5/2018

* cited by examiner

*Primary Examiner* — Jannelle M Lebron
(74) *Attorney, Agent, or Firm* — Venable LLP

(57) ABSTRACT

An ink jet printing apparatus comprises a controller and a printhead control unit positioned between the controller and the printhead and configured to control the printhead upon an instruction from the controller. The controller comprises a control unit configured to, in a case where transmission of an instruction to the printhead control unit failed, if the instruction is an instruction included in a first communication sequence performed periodically with respect to the printhead control unit in order to control the printhead, not execute a retry of the failed instruction, and in a case where the instruction is an instruction included in a second communication sequence performed aperiodically with respect to the printhead control unit in order to control the printhead, retry the failed instruction.

13 Claims, 9 Drawing Sheets

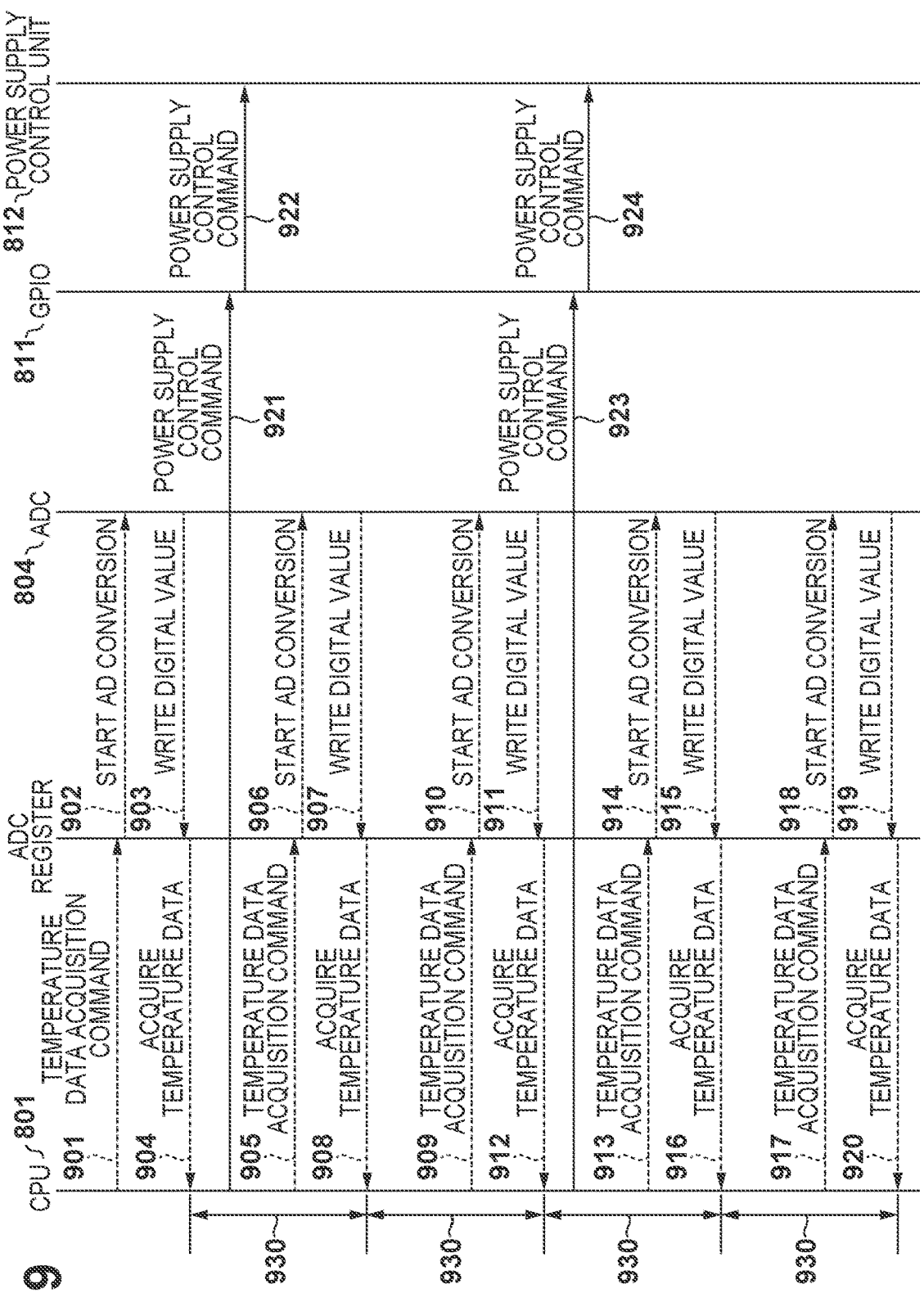

INK JET PRINTING APPARATUS

BACKGROUND

Field

The present disclosure relates to an ink jet printing apparatus.

Description of the Related Art

In an ink jet printing apparatus, control of a printhead with a large number of ink jet nozzles is performed. The printhead is controlled not only by a controller including the CPU but also by hardware using an external printhead control IC. The control of the printhead includes, for example, temperature detection control and voltage supply control, and the printhead control IC executes these controls in accordance with an instruction from the CPU. The controller including the CPU and the printhead control IC are connected by a serial interface, and when communication on the serial interface fails, communication (retry) is performed again. When temperature detection control and voltage supply control are executed in a printhead control IC, appropriate retry control is required for each of them.

In Japanese Patent Laid-Open No. 2018-77679, it is described that a communication error between a CPU and an external device is detected according to a configuration for error correction using ECCs or the like, and the detected error is stored in an error detection memory. Note that ECC is an abbreviation of Error-Correcting Code.

SUMMARY

The present disclosure provides an ink jet printing apparatus which performs retry control according to respective printhead controls with a simple configuration.

The present disclosure in one aspect provides an ink jet printing apparatus that has a printhead, the apparatus comprising: a controller; and a printhead control unit positioned between the controller and the printhead and configured to control the printhead upon an instruction from the controller, wherein the controller comprises a control unit configured to, in a case where transmission of an instruction to the printhead control unit failed, if the instruction is an instruction included in a first communication sequence performed periodically with respect to the printhead control unit in order to control the printhead, not execute a retry of the failed instruction, and in a case where the instruction is an instruction included in a second communication sequence performed aperiodically with respect to the printhead control unit in order to control the printhead, retry the failed instruction.

According to the present invention, it is possible to perform retry control according to each printhead control with a simple configuration.

Further features of the present invention will become apparent from the following description of exemplary embodiments with reference to the attached drawings.

BRIEF DESCRIPTION OF THE DRAWINGS

FIG. 9 is a view showing a control sequence in the configuration of FIG. 8.

DESCRIPTION OF THE EMBODIMENTS

Figure 1:
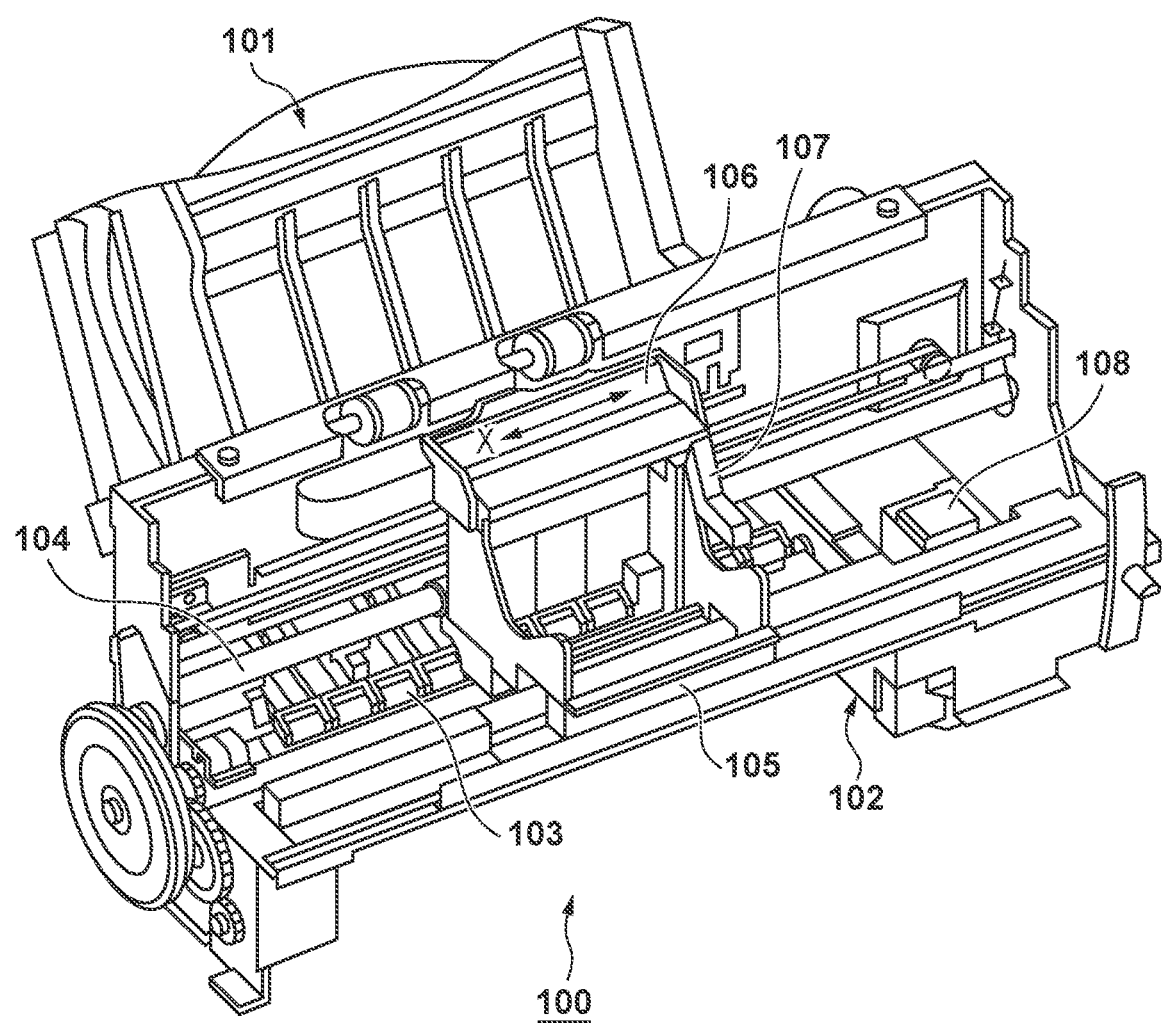
FIG. 1 is a perspective view showing a schematic configuration of the vicinity of a print unit of an image forming apparatus.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

When a configuration for error correction using ECC or the like disclosed in Japanese Patent Laid-Open No. 2018-77679 is mounted as hardware, a cost for this is incurred. In addition, there are various communication sequences for the printhead control, and it is not appropriate to uniformly apply a configuration for error correction using ECCs or the like to each printhead control.

According to one aspect of the present embodiment, it is possible to perform retry control according to each printhead control with a simple configuration.

FIG. 1 is a perspective view showing a schematic configuration of the vicinity of a print unit of an image forming apparatus in the present embodiment. In the present embodiment, as an image forming apparatus, an ink jet printing apparatus that performs printing onto a print medium by an inkjet printing method will be described. In FIG. 1, an ink jet printing apparatus 100 includes an automatic feeding unit 101, a conveying unit 103, and a recovery unit 108. The automatic feeding unit 101 is a unit for automatically feeding a print medium such as printing paper to the inside of the apparatus main body, and includes a feeding roller and a motor. The conveying unit 103 is a unit that guides print mediums that are separated from the automatic feeding unit 101 one by one and fed to a predetermined printing position, and also guides the print medium from the printing position to the discharging unit 102, and includes a conveying roller and a motor. The recovery unit 108 is a unit that performs a recovery process with respect to a print unit that performs printing on a print medium transported to a printing position, and includes a suction mechanism or a blade mechanism for sucking the remaining ink at the ejection port of the nozzle. The print unit includes a carriage 105 which is movably supported in a main scanning direction of an arrow X by a carriage shaft 104, and a printhead 201 (described later in FIG. 2) which is removably mounted on the carriage 105. In FIG. 1, the conveying direction of the print medium perpendicular to the main scanning direction is also referred to as the sub-scanning direction.

The carriage 105 is provided with a carriage cover 106 and a printhead setting lever 107 for engaging the carriage 105 to guide the printhead 201 to a predetermined mounting position on the carriage 105. The printhead setting lever 107 is used to engage a tank holder of the printhead 201 to set and press the printhead 201 in a predetermined mounting position. A printhead setting plate (not shown) is provided on the upper portion of the carriage 105 so as to be rotatable with respect to the printhead setting lever axis and is spring-biased towards a portion for engaging with the printhead 201. The printhead setting lever 107 mounts the printhead 201 to the carriage 105 while pressing the printhead 201 due to its spring force.

In the present embodiment, an ink jet printing apparatus will be described in which is mounted a so-called serial type printhead, which performs printing on a print medium by reciprocating movement of the carriage 105 in a main scanning direction. However, another type of printhead, for example, an ink jet printing apparatus in which a so-called line type printhead in which nozzle rows of the printhead are provided across the width of the print medium is mounted may be used.

Figure 2:
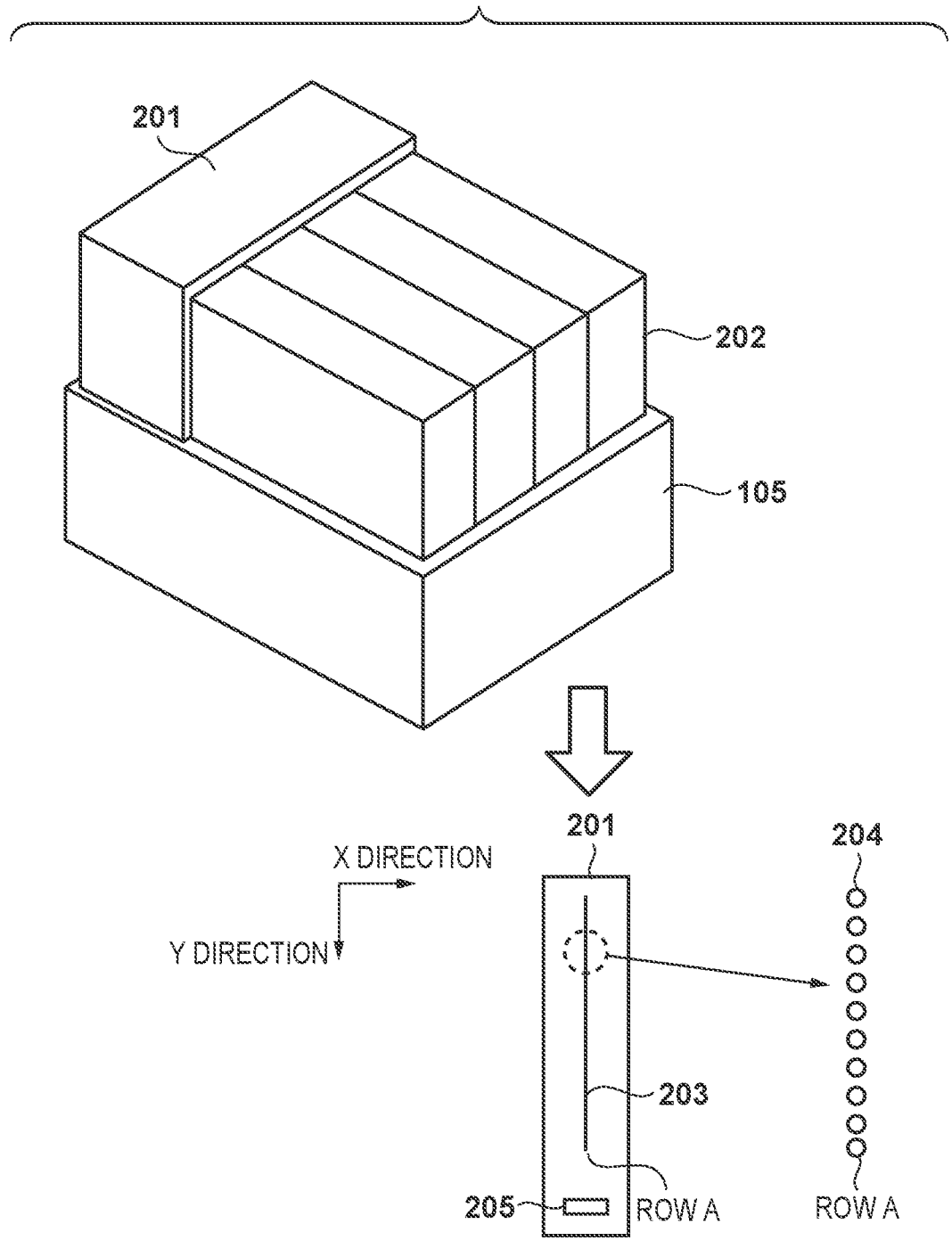
FIG. 2 is a view for explaining a printhead.

FIG. 2 is a view for explaining the printhead 201. The printhead 201 engages with the carriage 105 to perform printing. The printhead 201 is configured as a unit in which there are print element rows corresponding to each colored ink stored in the ink cartridge 202. The ink cartridge 202 individually stores, for example, black (Bk), cyan (C), magenta (M), and yellow (Y) inks, and each storage chamber is integrally configured.

The printhead 201 is provided with a print element row (nozzle row) 203. In FIG. 2, only one row (row A) is shown in the figure. The X direction in the figure corresponds to the main scanning direction, and the Y direction corresponds to the sub-scanning direction. The print element row 203 includes a plurality of print elements (nozzles) 204. The print element 204 is an electrothermal converter and is arranged along the Y direction, and ink droplets are ejected from a nozzle corresponding to the print element 204. In this embodiment, a configuration in which ink droplets are ejected using a heater is adopted as an example of an inkjet printing method. The print element row 203 provided in the printhead 201 is used for printing one color component. The printhead 201 ejects ink droplets at a predetermined ejection timing during movement in the X direction along the carriage shaft 104, thereby performing printing onto the print medium. Further, the printhead 201 includes a temperature detection diode 205 and is capable of detecting an ambient temperature of the printhead 201. There are cases where only one temperature detection diode 205 is provided per printhead and cases where one temperature detection diode 205 is provided for each nozzle row. Further, the temperature detection diode 205 may be provided in the upper portion and the lower portion of each print element row 203 so that the temperature is acquired in accordance with the position of the printhead.

Figure 3:
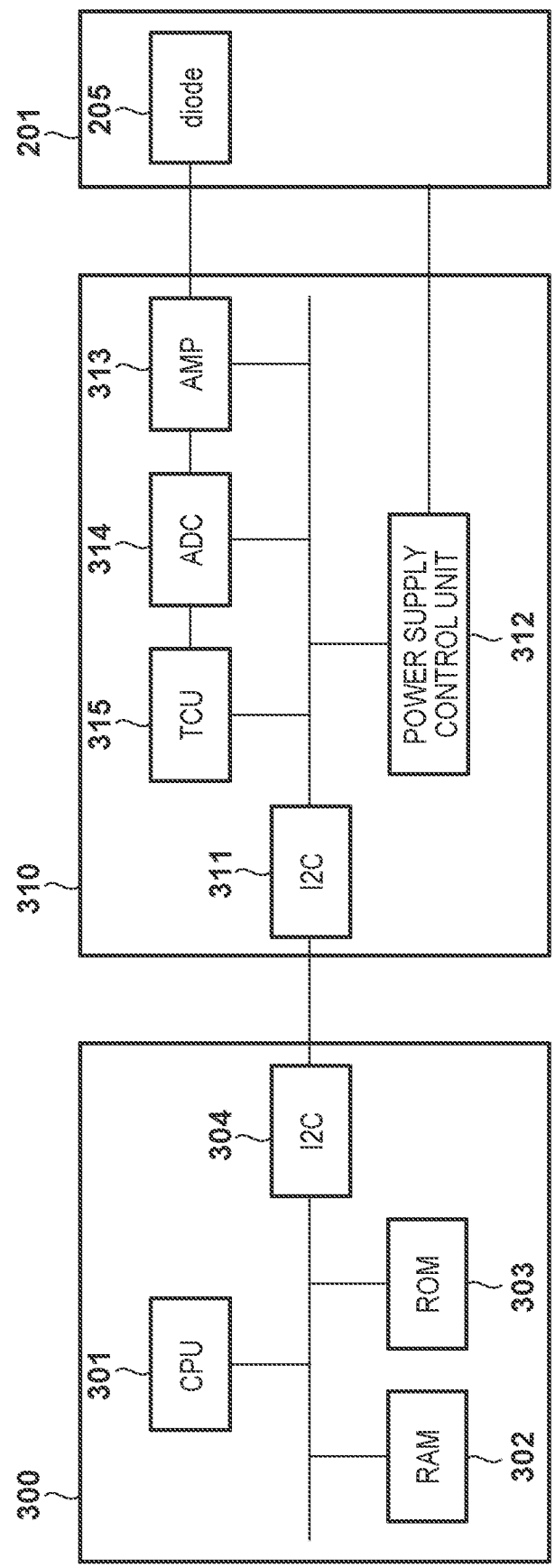
FIG. 3 is a view illustrating a block configuration for driving a printhead.

FIG. 3 is a view illustrating a block configuration for driving the printhead 201 in the present embodiment. In FIG. 3, a main controller 300, a printhead control unit 310 and a printhead 201 are shown.

The main controller 300 includes a CPU 301, a RAM 302, a ROM 303, and an I2C (Inter-Integrated Circuit) interface 304. The CPU 301 is a processor that comprehensively controls the ink jet printing apparatus 100. The RAM 302 is a data region that stores data as appropriate and operates as, for example, a working memory of the CPU 301. The ROM 303 stores a control program and data for realizing the functions of the ink jet printing apparatus 100. The functions of the ink jet printing apparatus 100 are realized, for example, by the CPU 301 reading a program stored in the ROM 303 into the RAM 302 and execute the program.

The printhead control unit 310 includes an I2C interface 311, a power supply control unit 312, a signal amplification unit (AMP) 313, an analog/digital (A/D) converter (ADC) 314, and a timer control unit (TCU) 315. The signal amplification unit 313 amplifies a voltage signal output from the temperature detection diode 205 of the printhead 201. AD converter 314 converts the analog signal (voltage signal) amplified by the signal amplification unit 313 into a digital signal. A timer control unit 315 periodically generates a trigger signal for causing AD conversion to be performed in the AD converter 314. The timer control unit 315 is independent of an instruction from the main controller 300, and it is possible to autonomously generate a periodic trigger signal using, for example, an internal clock. The power supply control unit 312 executes power supply control of the printhead 201.

As shown in FIG. 3, in the present embodiment, the main controller 300 and the printhead control unit 310 are connected by an I2C bus via I2C interfaces 304 and 311 which are serial interfaces. The power supply control unit 312 of the printhead control unit 310 is controlled from the main controller 300 via the I2C bus. The printhead 201 has a plurality of power supply systems, such as a power supply for driving a heater, a power supply for driving a logic IC, or the like. Power supply for each of such a plurality of power supply systems, by an instruction from the main controller 300, is started by the power supply control unit 312.

The voltage signal output from the temperature detection diode 205 amplified by the signal amplification unit 313 is converted into a digital signal by the A/D converter 314 of the printhead control unit 310. In the present embodiment, the AD converter 314, in response to the trigger signal generated by the timer control unit 315, executes the AD conversion in relation to the voltage signal. The CPU 301 communicates with the printhead control unit 310 via the I2C bus to acquire the temperature data of the printhead 201 converted into a digital signal from the A/D converter 314 of the printhead control unit 310. Thus, in the present embodiment, the power control signal and the temperature control signal are transmitted on the I2C bus between the main controller 300 and the printhead control unit 310.

Figure 4:
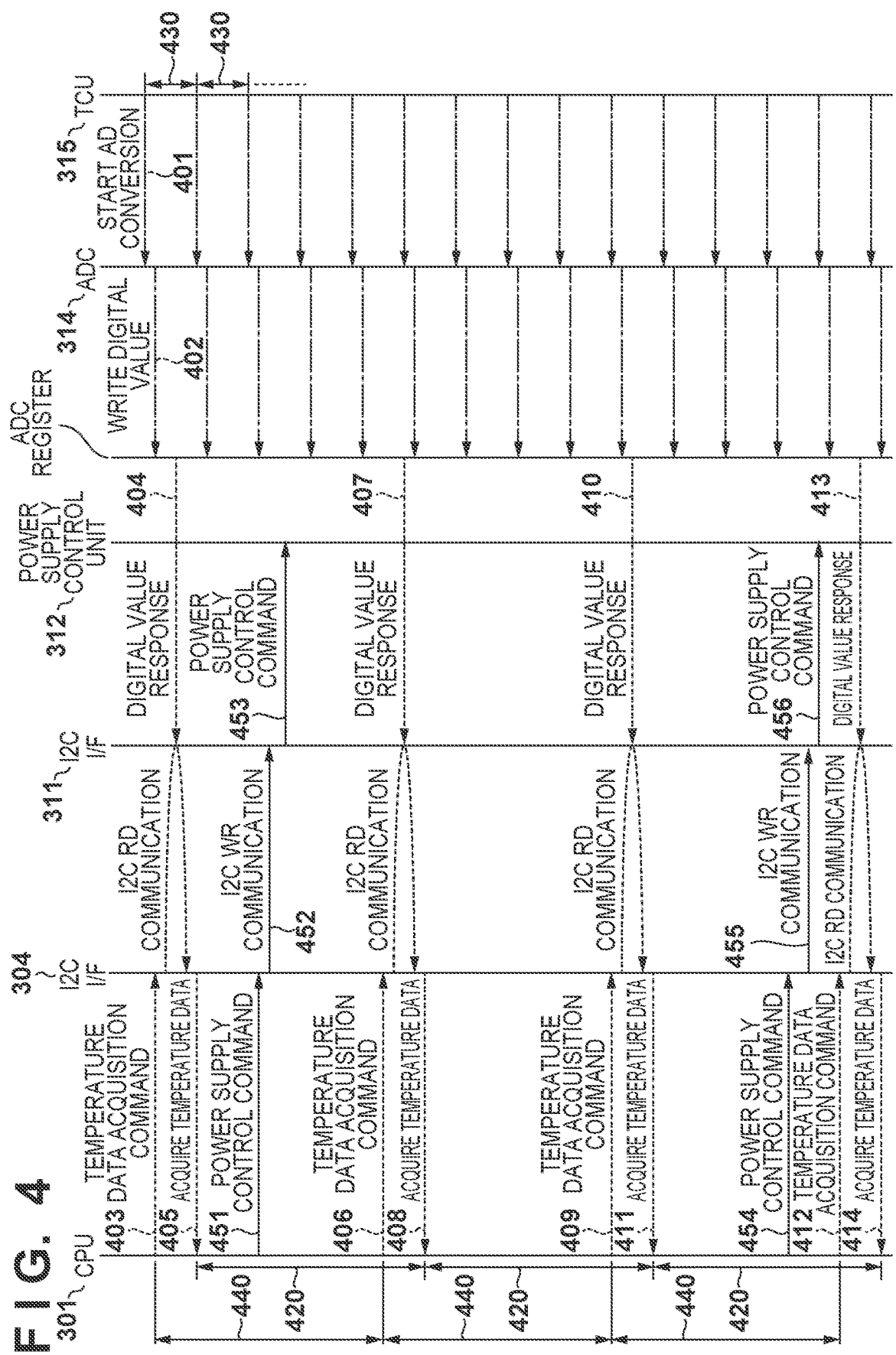
FIG. 4 is a view showing a control sequence.

FIG. 4 is a view showing a control sequence that is executed in the configuration of FIG. 3. As described below, the CPU 301 of the main controller 300 periodically communicates with the AD converter 314 of the printhead control unit 310 via the I2C bus, and acquires register values written in the ADC register of the AD converter 314.

The A/D converter 314 of the printhead control unit 310 receives the trigger signal of the AD conversion start generated by the timer control unit 315 (Step 401). Then, the A/D converter 314 performs AD conversion on the voltage signal of the temperature detection diode 205 of the printhead 201 amplified by the signal amplification unit 313. The AD converter 314 stores the temperature data, which is the conversion result, in the ADC register of the AD converter 314 (step 402). On the other hand, the CPU 301 of the main controller 300 transmits a temperature acquisition command to the printhead control unit 310 via the I2C bus. Also, the CPU 301 reads out the temperature data stored in the ADC register of the AD converter 314 of the printhead control unit 310 via the I2C bus (steps 403, 404, and 405). In this manner, the CPU 301 of the main controller 300 acquires the temperature data of the printhead 201 via the I2C bus. The CPU 301 stores the acquired temperature data in the RAM 302.

FIG. 4 shows that the communication sequence from the transmission of the temperature data acquisition command to the temperature data acquisition is repeatedly performed. That is, the same communication sequence as steps 403 to 405 is performed in steps 406 to 408, steps 409 to 411, and steps 412 to 414. The accuracy of the temperature information indicated by the temperature data acquired from the printhead 201 cannot be judged by only one data acquisition. Therefore, the CPU 301 acquires the temperature data a plurality of times as shown in FIG. 4, and determines the accuracy based on the history of the temperature data stored in the storage area such as the RAM 302. The determination of the accuracy is performed based on, for example, whether or not the continuity of data satisfies a condition.

Temperature data acquired from the printhead 201 in response to a request from the CPU 301 is used for temperature control of the printhead 201. The temperature control of the printhead 201 is, for example, ink viscosity control. In the present embodiment, the period 420 at which the temperature data is acquired by the CPU 301 is sufficiently shorter than the period at which of the temperature information required for the temperature control of the printhead 201 is updated. The period 430 at which the timer control unit 315 transmits a trigger signal to the A/D converter 314 is shorter than the period 440 at which the CPU 301 transmits a temperature data acquisition command. With this configuration, it is possible to prevent an increase in the communication amount on the I2C bus between the main controller 300 and the printhead control unit 310 and to use temperature data having a highly real-time nature when the temperature control of the printhead 201 is performed.

Meanwhile, when the power supply control unit 312 of the printhead control unit 310 receives the power supply control command from the CPU 301 via the I2C bus (steps 451 to 453), it supplies power to the printhead 201. Since the power supply control command is executed based on the print operation of the ink jet printing apparatus 100, unlike the acquisition of the above-described temperature data, the power supply control command is aperiodic communication. For example, the printer executes a power supply control command at a timing when printing data is received from the information processing apparatus. Since the print data is received at an arbitrary aperiodic timing, the communication of the power supply control command is also performed aperiodically. In FIG. 4, a communication sequence similar to steps 451 to 453 is performed in steps 454 to 456.

Hereinafter, in the present embodiment, an aperiodic communication between the main controller 300 and the printhead control unit 310 and an operation when the periodic communication fails will be described.

Figure 5:
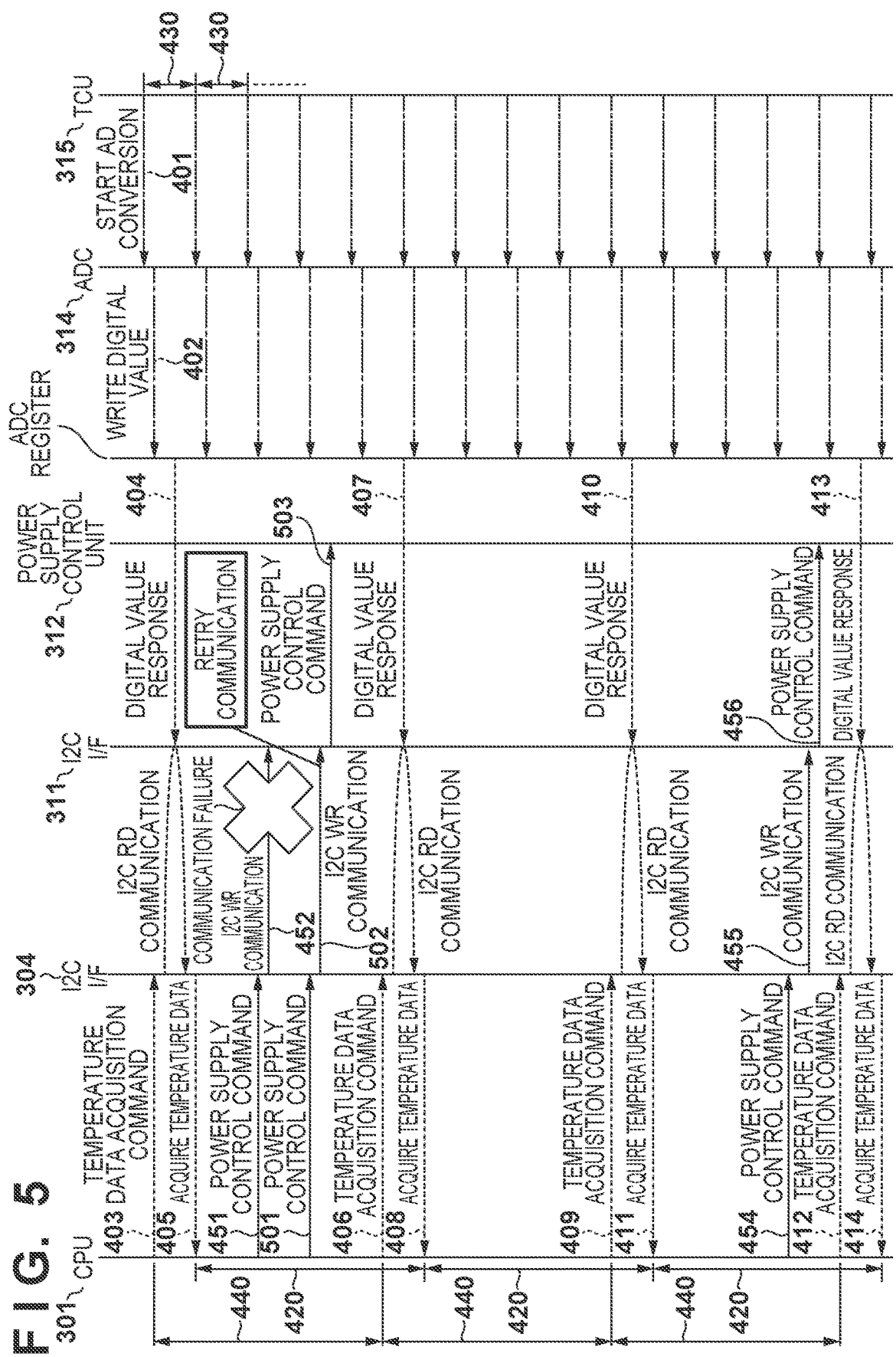
FIG. 5 is a view showing a sequence when aperiodic communication fails.

FIG. 5 is a view showing a sequence when aperiodic communication fails. In the present embodiment, the CPU 301 determines whether the I2C bus communication has succeeded or failed after issuing the power supply control command. FIG. 5 shows a case where it is determined that the communication fails due to a factor such as a disturbance in the I2C bus communication of the power supply control of the printhead 201. Since the power supply control of the printhead 201 is executed at the timing of printing by the printhead 201, if the power supply control cannot be executed normally, the printhead 201 cannot be used. Therefore, the I2C bus communication related to the power supply control of the printhead 201 needs to be resumed as quickly as possible when it is determined that the communication has failed.

In this embodiment, after the transmission of the power supply control command 451 from the CPU 301, if the I2C bus communication between the I2C interface 304 and the I2C interface 311 is determined to have failed, the CPU 301 executes a communication retry by issuing a power supply control command 501. When it is determined that the I2C bus communication is successful, the power supply control unit 312 receives the power supply control command 503 and supplies power to the printhead 201.

The CPU 301 may be configured to read back the data written to the I2C interface 311 or to monitor the power supply state of the printhead 201 when determining whether the I2C bus communication is successful or failed. For example, when the data read back from the I2C interface 311 does not satisfy the predetermined condition, the CPU 301 determines that the I2C bus communication has failed. The predetermined condition may be, for example, that the result of comparing the write data and the read back data is that the data match. Further, for example, the CPU 301 monitors the power supply state of the printhead 201, and when the power supply state of the printhead 201 after the transmission of the power supply control command does not satisfy a predetermined condition, it is determined that the I2C bus communication has failed. The predetermined condition may be that, for example, the result of a comparison of the power supply state of the printhead 201 before/after the transmission of the power supply control command is that the power supply state of the printhead 201 has transitioned to a predetermined state. The CPU 301 retries the communication of the power supply control command when it is determined that the I2C bus communication has failed. Here, when the communication retry fails, the communication retry may be repeated up to a predetermined number of times. At this time, when the predetermined number of times has been reached or when it overlaps with the transmission timing of the temperature data acquisition command, the communication retry may be stopped and processed as an error.

As described above, in the present embodiment, when the aperiodic communication such as the power supply control command fails between the main controller 300 and the printhead control unit 310, the communication retry is immediately executed. With such a configuration, the influence on the driving of the printhead 201 can be minimized. Further, since the retry of the power supply control command is executed during the periodic communication of acquiring the temperature data, it is possible to prevent the retry processing from affecting the periodic communication.

Figure 6:
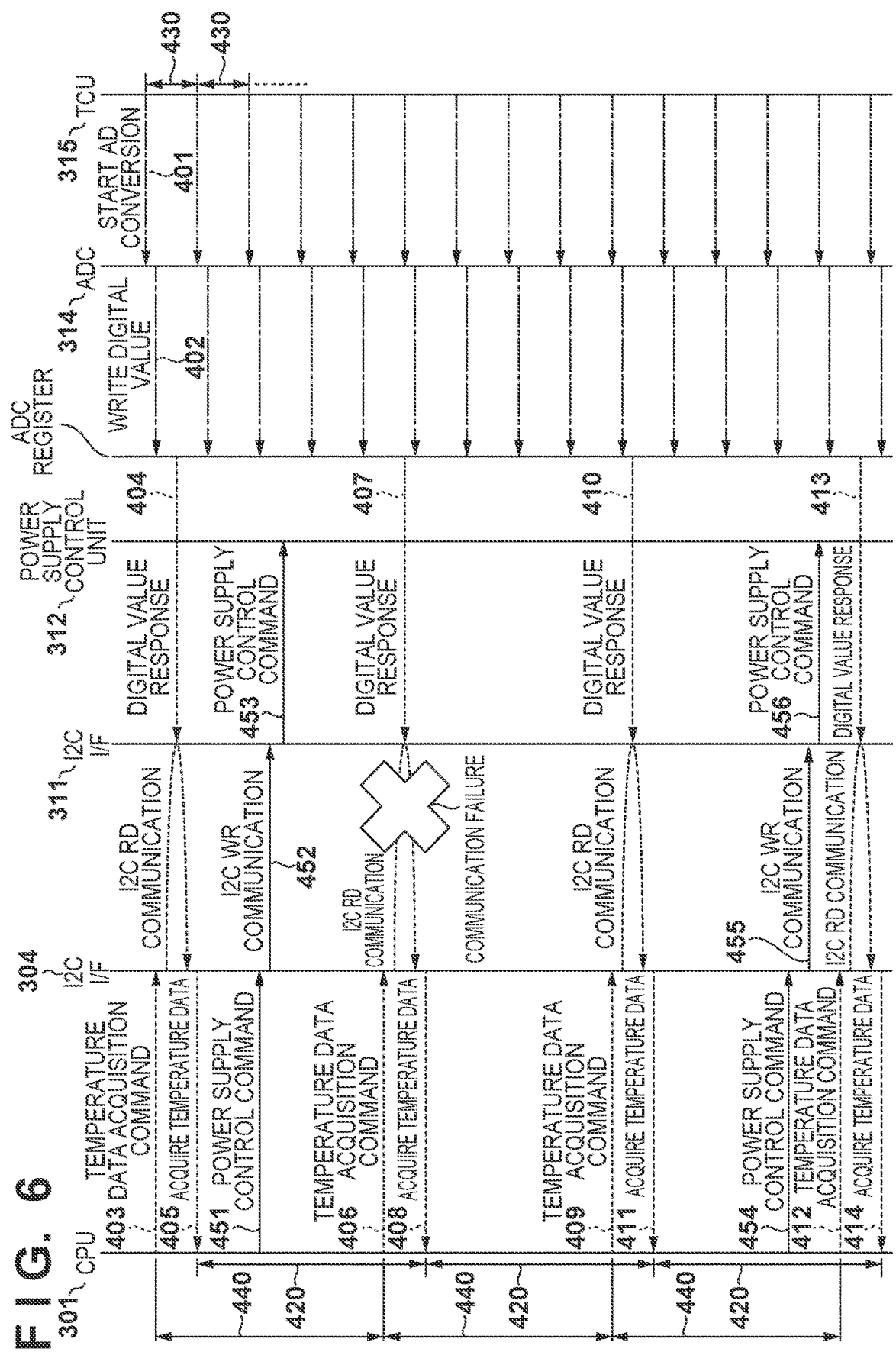
FIG. 6 is a view showing a sequence when aperiodic communication fails.

FIG. 6 is a view showing a sequence when periodic communication fails. In the present embodiment, the CPU 301 determines whether the I2C bus communication has succeeded or failed after issuing a temperature data acquisition command. FIG. 6 shows a case where, for example, after the issuance of the temperature data acquisition command in step 406, it is determined that the I2C bus communication of the temperature data acquisition of the printhead 201 has failed due to a factor such as a disturbance. However, unlike FIG. 5, when it is determined that the I2C bus communication has failed, the CPU 301 maintains the period of the communication sequence from the temperature data acquisition command to the temperature data acquisition without executing a communication retry. That is, the temperature data acquisition in step 408 is performed regardless of the success/failure of the I2C bus communication after the issuance of the temperature data acquisition command in step 406. In this case, the temperature data acquired in step 408 is data obtained in step 405 of the previous communication sequence, and the continuity of the data may be deficient which would affect the accuracy of the data. Therefore, after the I2C bus communication fails, the temperature data acquired in step 408 may be corrected. For example, the CPU 301 may analyze the continuity from the inclination and distribution of the values of the temperature data to date and correct the temperature data to a value that would have been obtained if the I2C bus communication were successful. With such a configuration, when disturbance to the I2C bus is immediately resolved, periodic communication can be prevented from being stopped as error processing.

As described above, the period 420 at which the temperature data of the printhead 201 is acquired is sufficiently shorter than the period at which of the temperature information required for the temperature control of the printhead 201 is updated. Therefore, it is not necessary to execute the communication retry immediately when an I2C communication error occurs. However, when the I2C bus communication is determined to be failed consecutively a predetermined number of times in the periodic communication, the CPU 301 determines that communication with the device connected by the I2C bus is not possible and executes error processing. For example, when the I2C interface 304 in the main controller 300 detects a NACK response and sends the CPU 301 a NACK response notification a predetermined number of times, the CPU 301 determines that the I2C bus communication is not possible and executes error processing. With such a configuration, for example, when the I2C bus is physically disconnected, it is possible to stop the periodic communication and advance the processing to error processing. The error process is a process of displaying, for example, a message indicating that the temperature information cannot be appropriately acquired on the display unit of the image forming apparatus. Also, other methods are possible, and a message may be displayed on an information processing apparatus capable of communicating with the image forming apparatus, for example.

The CPU 301 may be configured to read back the data written to the I2C interface 311 when determining whether the I2C bus communication is successful or failed. Another configuration may be used to determine whether the I2C bus communication was successful or failed. As described above, the temperature data of the printhead 201 is acquired based on the voltage signal from the temperature detection diode 205 in the printhead 201. The voltage signal of the temperature detection diode 205 is AD converted by the A/D converter 314 of the printhead control unit 310, but the level of the voltage signal may vary depending on factors such as disturbance. When fluctuation occurs in the level of the voltage signal of the temperature detection diode 205, the value of the digital signal AD conversion by the AD converter 314 may become temperature data greatly deviated from the temperature data of the printhead 201 which is assumed. Therefore, the CPU 301 may determine that the I2C bus communication has failed based on the acquisition of the temperature data that is outside of a predetermined range. In any case, when it is determined that the I2C bus communication has failed, the CPU 501 maintains the period of the communication sequence from the temperature data acquisition command to the temperature data acquisition without executing a communication retry.

In this way, in the present embodiment, when aperiodic communication such as the temperature data acquisition fails between the main controller 300 and the printhead control unit 310, no communication retry is executed. Such a configuration can reduce the amount of communication on the I2C bus.

Figure 8:
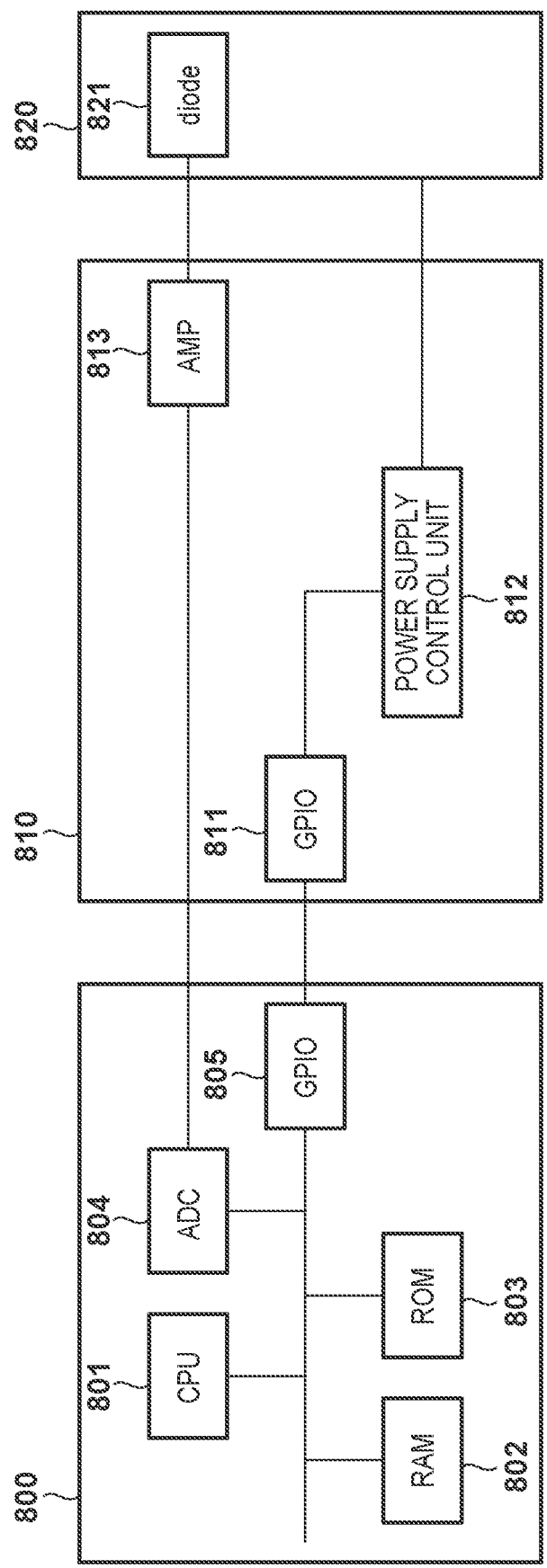
FIG. 8 is a view illustrating a block configuration for comparison against the present embodiment.

Hereinafter, effects of the present embodiment will be further described. To this end, first, the configuration of FIG. 8 will be described. FIG. 8 shows a configuration in which the main controller includes an A/D converter for comparison with the configuration of the present embodiment. In FIG. 8, a main controller 800, a printhead control unit 810 and a printhead 820 are shown.

The main controller 800 includes a CPU 801, a RAM 802, a ROM 803, a GPIO (General-Purpose Input/Output) port 805, and an AD converter (ADC) 804. The RAM 802 is a region that stores data as appropriate and operates as, for example, a working memory of the CPU 801. The ROM 803 stores a control program and data for realizing the functions of the ink jet printing apparatus. AD converter 804 converts the analog signal (voltage signal) amplified by the signal amplification unit (AMP) 813 of the printhead control unit 810 into a digital signal.

The printhead control unit 810 includes a GPIO port 811, a power supply control unit 812, and a signal amplification unit (AMP) 813. The signal amplification unit 813 amplifies a voltage signal output from the temperature detection diode 820 of the printhead 821. The power supply control unit 812 executes power supply control of the printhead 821. The printhead 820 and the temperature detection diode 821 correspond to the printhead 201 and the temperature detection diode 205, respectively.

In the configuration of FIG. 8, the main controller 800 and the printhead control unit 810 are connected to each other via GPIO ports 805 and 811. The power supply control unit 812 of the printhead control unit 810 is controlled from the main controller 800 via the GPIO ports 805 and 811. The printhead 820 has a plurality of power supply systems similar to the printhead 201, and power supply to the printhead 820 is started by the power supply control unit 812 according to an instruction from the main controller 800.

The voltage signal output from the temperature detection diode 821 amplified by the signal amplification unit 813 is converted into a digital signal by the A/D converter 804 of the main controller 800. In the configuration shown in FIG. 8, the CPU 801 acquires the temperature data of the printhead 820 based on the converted digital signals. As shown in FIG. 8, the signal line between the A/D converter 804 and the signal amplification unit 813 is configured separately from GPIO ports 805 and 811.

FIG. 9 is a view showing a control sequence that is executed in the configuration of FIG. 8. As described below, the CPU 801 of the main controller 800 periodically communicates with the AD converter 804 through the ADC register, and acquires the register value stored in the ADC register of the AD converter 804.

The CPU 801, when writing the temperature data acquisition command to the ADC register (step 901), the AD conversion start trigger is sent from the ADC register to the AD converter 804 (step 902). Then, the A/D converter 804 performs AD conversion on the voltage signal of the temperature detection diode 821 of the printhead 820 amplified by the signal amplification unit 813 of the printhead control unit 810. The AD converter 804 stores the temperature data, which is the conversion result, in the ADC register of the AD converter 804 (step 903) as a register value. The CPU 801 of the main controller 800 acquires the temperature data of the printhead 820 by reading the register values stored in the ADC register, and stores the acquired temperature data in the RAM 802 (step 904).

FIG. 9 shows that the communication sequence from the transmission of the temperature data acquisition command to the temperature data acquisition is repeatedly performed. That is, the same communication sequence as steps 901 to 904 is performed in steps 905 to 908, steps 909 to 912, step 913 to 916, and steps 917 to 920.

Meanwhile, when the power supply control unit 812 of the printhead control unit 810 receives the power supply control command from the CPU 801 via the GPIO port (steps 921 and 922), it supplies power to the printhead 820. Since the power supply control command is executed based on the print operation of the ink jet printing apparatus, unlike the acquisition of the temperature data, the power supply control command is aperiodic communication. In FIG. 9, a communication sequence similar to steps 921 and 922 is performed in steps 923 and 924.

Even in the configuration of FIG. 8 and FIG. 9, the period 930 at which the temperature data is acquired is sufficiently shorter than the period at which of the temperature information required for the temperature control of the printhead 820 is updated. However, in the case of the configurations of FIGS. 8 and 9, in order to acquire temperature data having a higher real-time property, the period at which temperature data is acquired 930 needs to be made shorter, which leads to an increase in the CPU 801 communication load and the amount of communication in the main controller 800. On the other hand, in the case of the configuration of the present embodiment illustrated in FIGS. 3 and 4, the period 430 at which the timer control unit 315 in the printhead control unit 310 transmits the trigger signal to the A/D converter 314 may be adjusted. As a result, in the present embodiment, it is possible to prevent an increase in the CPU 301 communication loads and communication volumes in the main controller 300, and it is also possible to acquire temperature data having a higher real-time characteristic.

Figure 7:
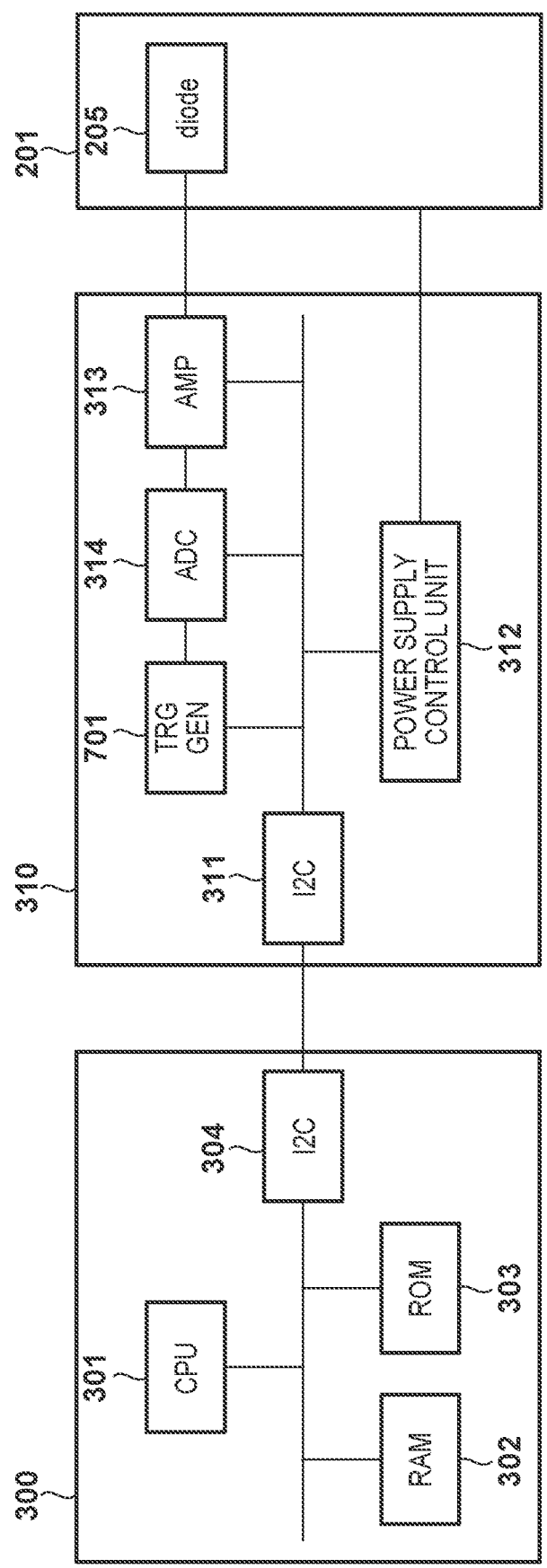
FIG. 7 is a view illustrating another block configuration for driving a printhead.

In the present embodiment, the timer control unit 315 has been described as a configuration for periodically generating a trigger signal for performing AD conversion in the AD converter 314. As described above, the timer control unit 315 is independent of an instruction from the main controller 300, and it is possible to autonomously generate a periodic trigger signal using, for example, an internal clock. However, instead of the timer control unit 315, as shown in FIG. 7, a trigger signal generation unit (TRGGEN) 701 that generates a trigger signal by receiving an instruction from the CPU 301 may be configured. According to the configuration of FIG. 7, the generation timing of the trigger signals, that is, the start timing of the AD conversion of the A/D converter 314, can be controlled from the CPU 301.

As described above, according to the present embodiment, suitable retry control can be performed in accordance with the communication sequence between the main controller 300 and the printhead control unit 310 in each control of the printhead 201.

In the present embodiment, the periodic communication for acquiring the temperature data and the aperiodic communication for the power supply control command have been described as examples. However, the processing of the present embodiment may be applied to periodic communication and aperiodic communication performed for other purposes. For example, suppose that the remaining ink amount is held in the memory in the printhead. In this case, the processing of the present embodiment may be applied to periodic communication for acquiring the state of the printhead and aperiodic communication for acquiring the remaining ink amount from the printhead at aperiodic timing at which printing ends.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-173539, filed Oct. 14, 2020, which is hereby incorporated by reference herein in its entirety.

What is claimed is:

1. An ink jet printing apparatus that has a printhead, the apparatus comprising:
   a controller; and
   a printhead control unit positioned between the controller and the printhead and configured to control the printhead upon receiving an instruction from the controller, wherein
   the controller
   comprises a control unit configured to, in a case where transmission of an instruction to the printhead control unit failed, if the instruction is an instruction included in a first communication sequence performed periodically with respect to the printhead control unit in order to control the printhead, not execute a retry of the failed instruction, and in a case where the instruction is an instruction included in a second communication sequence performed aperiodically with respect to the printhead control unit in order to control the printhead, retry the failed instruction.

2. The ink jet printing apparatus according to claim 1, wherein the control unit executes the retry of the failed instruction at a timing that does not overlap a timing of an instruction in the first communication sequence.

3. The ink jet printing apparatus according to claim 1, wherein the first communication sequence is a sequence in which data that is stored in the printhead control unit is repeatedly acquired.

4. The ink jet printing apparatus according to claim 3, wherein the data stored in the printhead control unit is temperature data of the printhead.

5. The ink jet printing apparatus according to claim 4, wherein even in the case where transmission of the instruction to the printhead control unit failed, the transmitted temperature data of the printhead in the first communication sequence is acquired.

6. The ink jet printing apparatus according to claim 5, wherein the control unit comprises a correction unit configured to, in a case where the instruction to the printhead control unit failed, correct the transmitted temperature data of the printhead acquired in the first communication sequence.

7. The ink jet printing apparatus according to claim 3, wherein
the printhead control unit further comprises:
a conversion unit configured to convert an analog signal indicating temperature information from the printhead into a digital signal; and
a storage unit configured to store the data of the digital signal that was converted by the conversion unit.

8. The ink jet printing apparatus according to claim 7, wherein
the printhead control unit
further comprises: a generation unit configured to generate a trigger signal for starting a conversion by the conversion unit, wherein
the conversion unit converts an analog signal indicating temperature information from the printhead into a digital signal based on the trigger signal.

9. The ink jet printing apparatus according to claim 8, wherein the generation unit periodically generates the trigger signal independent of an instruction from the controller.

10. The ink jet printing apparatus according to claim 8, wherein the generation unit periodically generates the trigger signal upon an instruction from the controller.

11. The ink jet printing apparatus according to claim 8, wherein a period at which the generation unit generates the trigger signal is shorter than a predetermined period at which the first communication sequence is performed.

12. The ink jet printing apparatus according to claim 3, wherein a predetermined period at which the first communication sequence is performed is shorter than a period of control of the printhead performed using data acquired from the printhead control unit.

13. The ink jet printing apparatus according to claim 1, wherein
the printhead control unit
further comprises: a power supply control unit configured to perform power supply control in relation to the printhead, wherein
the instruction included in the second communication sequence is an instruction related to the power supply control unit.

* * * * *